Aug. 22, 1961 P. KOTILAINEN 2,997,649
DEVICE FOR CONTINUOUS MEASUREMENT OF MOISTURE
OF THE PAPER TRACK OR THE LIKE
Filed Nov. 13, 1957 2 Sheets-Sheet 1

INVENTOR.
PAAVO KOTILAINEN
BY Herman I. Gordon
ATTORNEY

INVENTOR.
PAAVO KOTILAINEN
BY Herman A. Gordon
ATTORNEY

United States Patent Office 2,997,649
Patented Aug. 22, 1961

2,997,649
DEVICE FOR CONTINUOUS MEASUREMENT OF MOISTURE OF THE PAPER TRACK OR THE LIKE
Paavo Kotilainen, Oy Control Ab, Eerikinkatu 24, Helsinki, Finland
Filed Nov. 13, 1957, Ser. No. 696,243
Claims priority, application Finland Nov. 19, 1956
15 Claims. (Cl. 324—61)

The object of this invention is to provide a procedure and a device for continuous measurement of moisture, particularly of a paper strip, but also of, for instance, a plastic strip, or of flour or corresponding materials.

The purpose of the invention is to provide a device which makes continuous observations possible of the moisture of a strip, and in which means are provided to minimize harmful factors causing errors, mainly errors caused by temperature.

The main characteristics of the procedure according to the invention is that a network of resistances and/or reactances is used for measurement, in which a moisture change of the paper strip, or the like, affects one resistance or reactance of the network in contact with the strip, bringing about a voltage difference between two points of the circuit, upon which the adjoining circuit is brought to equilibrium, and the measured result is read off as the magnitude of the change caused by the return to equilibrium.

A device for employing the procedure is also part of the invention, which is mainly characterized in that a coupling means is provided taking power from a high frequency alternating current source, said coupling means comprising two condensers, one of which is in contact with the strip to be measured, bringing about a voltage difference between two points of a circuit, caused by a change in moisture content of the strip, and that part of the coupling means consists of a circuit with two rectifiers and a servo amplifier, which at a change in moisture content of the strip, with consequent voltage variation in the first-mentioned circuit, starts a servo motor which restores the equilibrium by adjustment of a resistance in said first-mentioned circuit, or a condenser in the network.

The invention comprises further as a particular device to be used in the procedure the combination composed of two condensers in the network, of which one condenser is in contact with the strip to be measured, and which device is characterized in that the condensers are combined in one piece of apparatus in such a way that the insulation plate forming part of it has attached on one side the conducting plates of the first condenser and on the other side the conducting plates of the second condenser.

The invention is explained further in connection with the accompanying drawings illustrating working examples, wherein.

Figure 1:
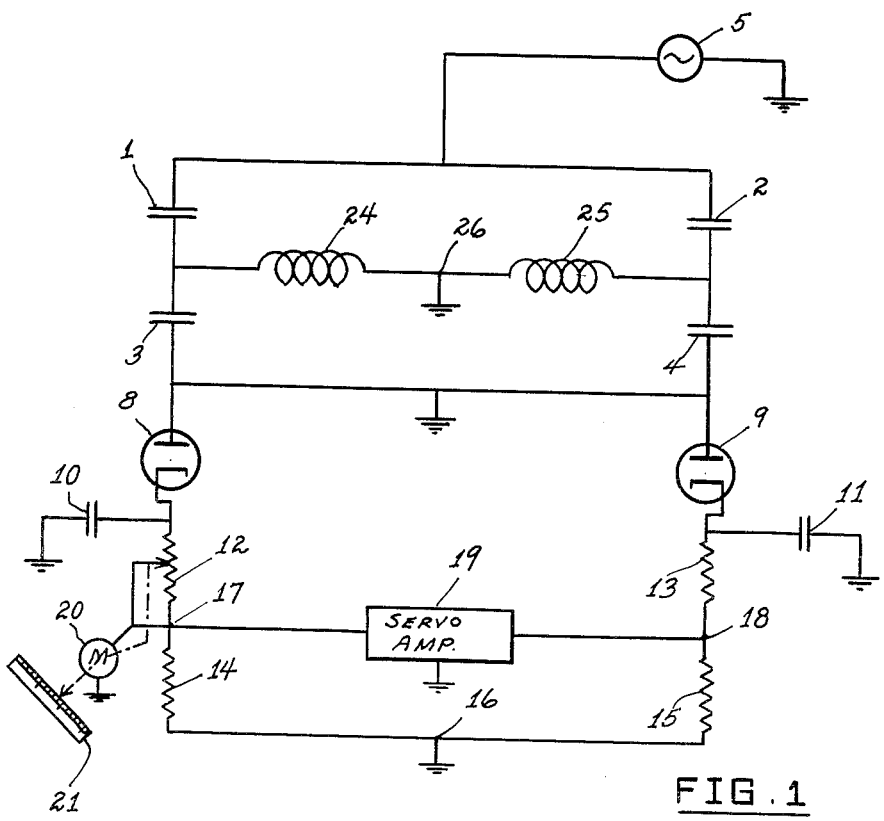
FIGURE 1 shows a diagram of connections to be used in one of the procedures according to the invention.

The four condensers 1, 2, 3 and 4 constituting a bridge network are fed by a high frequency alternator 5. Of these, the condenser 4 is in contact with the strip. The bridge network is at points 6 and 7 connected to a circuit containing the rectifiers 8 and 9, the cathodes of which are grounded through the condensers 10 and 11. This circuit consists further of equally large resistances 12, 13, 14 and 15, and the circuit is grounded at point 16. Between the points 17 and 18 in this circuit is further connected a servo amplifier 19, supplying current to a servo motor 20. By means of this motor a rheostat 12 is varied. To the motor is also connected a meter 21 for measuring the results. Between points 6 and 7 of the bridge network the windings 24 and 25 are connected, the point 26 between same being connected to ground.

The moisture measurement of the paper strip is based upon the fact that the dielectric constant of the paper changes as the moisture content of the paper changes. When the paper is brought into the field of the condenser being fed by high frequency alternating voltage, a change in the dielectric constant of the paper causes a change in the capacitance of the condenser. By determining the magnitude of this change, and the direction, the moisture of the paper is determined.

The change in capacitance in the condenser 4 as the moisture changes causes a voltage difference between points 6 and 7. This in turn causes a voltage difference between the points 17 and 18, which at the beginning are adjusted to the same voltage. The voltage difference between points 17 and 18 controls the motor 20 by means of the servo amplifier 19, which motor adjusts the value of the resistance 12 so that the voltage difference between the points 17 and 18 disappears. The result of this is also that the motor stops. At the same time the indicator connected to the motor shows the value corresponding to the voltage difference, or the change in moisture. The direction of rotation of the motor is dependent on the direction of the voltage difference, and therefore the indicator shows the corresponding values as the moisture decreases or increases. The measured results may be preserved by using a recording meter in a manner well known.

The equilibrium disturbance could also be eliminated in such a way that the servo motor changes the capacitance of the condenser 3. Then, a change in the moisture would show the magnitude of the change in the capacitance of the condenser 3.

Figure 2:
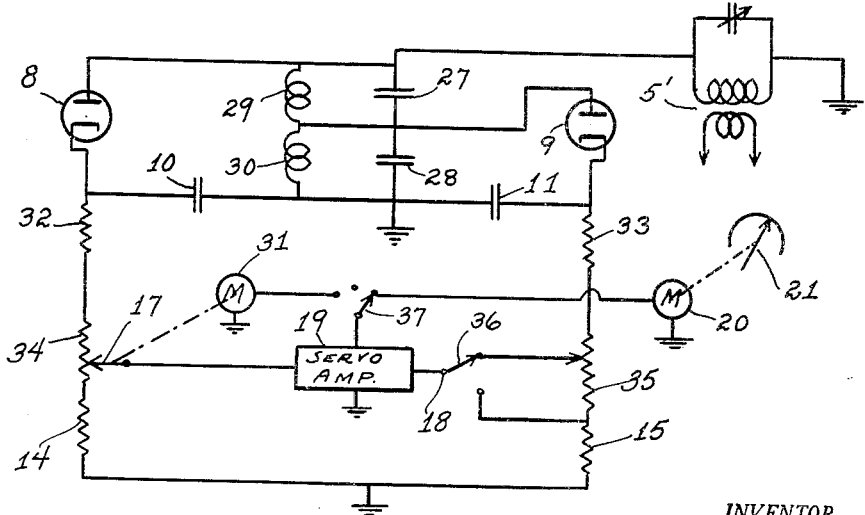
FIGURE 2 shows a diagram of the connections of a device somewhat different from the device of FIGURE 1.

The device according to the invention may also be such as indicated by the wiring diagram illustrated in FIGURE 2. Here the high frequency source 5' feeds the condensers 27 and 28 and the coils 29 and 30 in the network. The wiring diagrams of FIGURES 1 and 2 are very much alike, and the parts corresponding to each other have the same reference numerals in both diagrams. The condenser 28 is in contact with the strip and its capacitance therefore changes with the moisture. This produces a voltage difference between the input terminals 17 and 18 of the servo amplifier. Said amplifier 19 starts the servo motor 20, and the motor 20 adjusts the slider of the potentiometer 35 so that the voltage difference disappears. At the same time the motor stops, as well as the indicator connected to it.

This network includes an additional servo motor 31. Each circuit is connected to the servo amplifier by means of a potentiometer, which potentiometers are controlled by the servo motors. This arrangement is provided in order to test the device from time to time.

The switch 37 is turned so that neither motor is connected to the amplifier. The position of the measuring condenser is set so that it does not contact the strip. The switch 36 is turned so that point 18 connects to the terminal between the resistances 35 and 15. The switch 37 is now connected to the motor 31 circuit, thus adjusting the slider of the potentiometer 34 so that any voltage appearing between points 17 and 18 becomes zero. After this, coupling for measurement is restored. The switch 37 is set to center position, the condenser 28 is brought into contact with the strip, the switch 36 is turned into a position connecting the servo amplifier with the slider of the potentiometer 35, and finally the switch 37 is turned so that the amplifier 19 is connected to the motor 20.

The resistances 14, 15, 32 and 33 are fixed resistances and are so chosen that a suitable voltage will appear between the points 17 and 18. If the capacitances of the condensers 27 and 28 change at the same time in such a way that the relative changes of these capacitances are in the same direction and of equal magnitude, the voltage of the rectifier 9 does not change, because of the connections in the drawing. This is due to the fact that the relative distribution of the voltage in the condenser combination 27, 28 stays constant when the above-mentioned capacitance changes occur.

Because temperature changes cause changes in the condenser capacitance, it is important in connection with the above, that any temperature changes in the condensers 2 and 4 and the condensers 27 and 28 occur in the same way. On account of this, the device is provided with an assembly of these condensers in which one condenser is at about the same temperature state as the other despite temperature variations.

Figure 3:
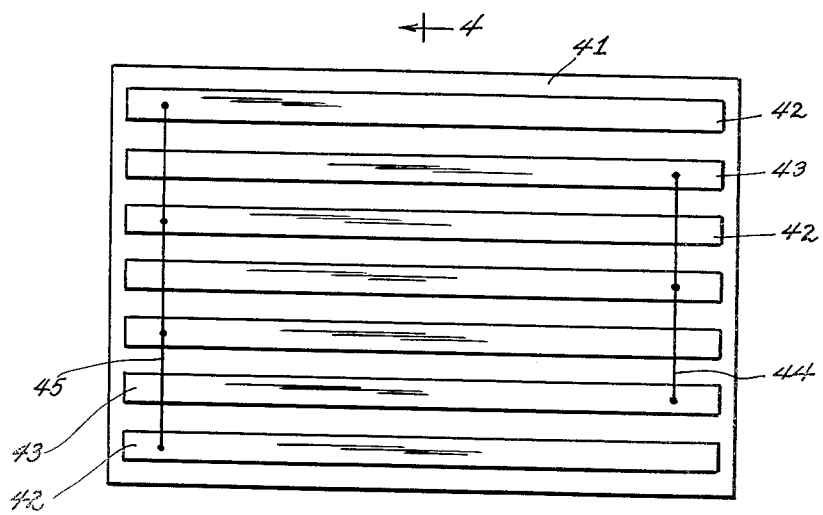
FIGURE 3 is a plan view of a condenser assembly according to the invention.
Figure 4:
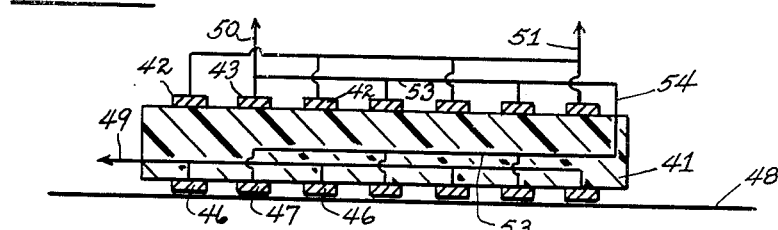
FIGURE 4 is a cross-sectional view taken on line 4—4 of FIGURE 3.

FIGURES 3 and 4 show metal bars or strips 42 and 43, above the insulation plate 41. The bars 42 are connected to each other by wires 45, and the bars 43 by the wires 44. Correspondingly, below, the bars 46 and 47 are attached and connected by the wires 52 and 53. In addition, the bars 43 and 47 are joined together by the wire 54. Thus, one side of the insulation plate represents one condenser, and the other side the other condenser. The strip whose moisture is to be measured is represented by the line 48.

The strip may be located either above the condenser, or below. The device may also be mobile and used for measuring moisture in a fixed strip.

Figure 5:
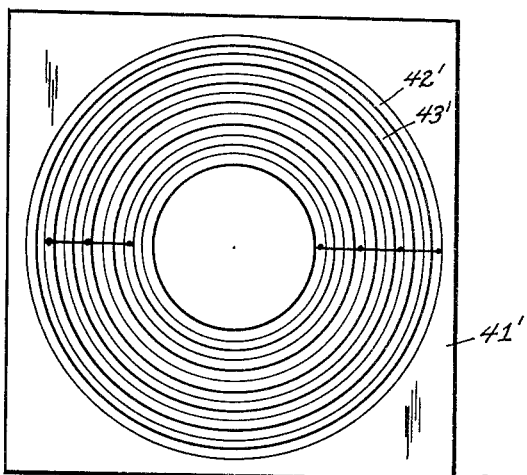
FIGURE 5 is a plan view of a further form of condenser assembly according to this invention.

In a construction according to FIGURE 5, the condenser plates are composed of concentric rings 42' and 43' and are mounted on an insulation plate 41'.

The wires should be placed so that they are not in the way of the strip. They may be situated on the opposite sides of the strip, at the ends of the insulation plate, or inside of it.

The common wire 50 is connected to the rectifier. The wire 49 is grounded, and the wire 51 is connected to the high frequency alternating current supply source.

The insulating material 41 or 41' may be chosen such that the ability thereof to conduct heat is good. It is advantageous to provide the condenser assembly with an additional cover, which is of help in maintaining the condensers at a common temperature.

The invention is not limited to the working examples above, but the procedure and the device may be changed within the limits of the invention in accordance with the requirements of the strip material and the circumstances in each case.

I claim:

1. A device for determining the moisture content of a layer of hygroscopic material including paper, pulp, fabric and the like, comprising, in combination, a source of high-frequency energy; a high-frequency measuring bridge circuit connected with its input to said source and including at least two fixed capacitors of normally equal capacitance having exposed plates and physically arranged adjacent each other, one of said capacitors being adapted to be placed with its exposed plates in an operative position relative to said layer in which the latter acts as a dielectric for said one capacitor and causes an unbalance of said measuring bridge circuit depending upon the moisture-dependent dielectric coefficient of said layer; a second, normally balanced measuring bridge circuit connected with its input terminals to the diagonally opposed output terminals of said high-frequency measuring bridge circuit and comprising at least one variable impedance component; balancing means for adjusting said variable impedance component in case the output voltages of said high-frequency bridge circuit applied to said second bridge circuit differ due to unbalance in said high-frequency bridge circuit, for balancing said second bridge circuit; and means for indicating the degree of adjustment of said variable impedance component, said degree of adjustment being a measurement of the moisture content of said layer.

2. A device for determining the moisture content of a layer of hygroscopic material including paper, pulp, fabric and the like, comprising, in combination, a source of high-frequency energy; a high-frequency measuring bridge circuit connected with its input to said source and including at least two fixed capacitors of normally equal capacitance having exposed plates and physically arranged adjacent each other, one of said capacitors being adapted to be placed with its exposed plates in an operative position relative to said layer in which the latter acts as a dielectric for said one capacitor and causes an unbalance of said measuring bridge circuit depending upon the moisture-dependent dielectric coefficient of said layer; rectifier means connected to each of the diagonally opposed output terminals of said high-frequency bridge circuit for rectifying its output voltages; a second, normally balanced direct-current bridge circuit connected with its input terminals to said rectifier means, respectively, and comprising at least one variable resistor component; balancing means for adjusting said variable resistor component, in case the rectified output voltages of said high-frequency circuit applied to said second bridge circuit differ due to unbalance in said high-frequency bridge circuit, for balancing said second bridge circuit; and means for indicating the degree of adjustment of said variable resistor component, said degree of adjustment being a measurement of the moisture content of said layer.

3. A device for determining the moisture content of a layer of hygroscopic material including paper, pulp, fabric and the like, comprising, in combination, a source of high-frequency energy; a high-frequency measuring bridge circuit connected with its input to said source and including at least two fixed capacitors of normally equal capacitance having exposed plates and physically arranged adjacent each other, one of said capacitors being adapted to be placed in an operative position relative to said layer in which the latter acts as a dielectric for the plates of said one capacitor and causes an unbalance of said measuring bridge circuit depending upon the moisture-dependent dielectric coefficient of said layer; rectifier means connected to each of the diagonally opposed output terminals of said high-frequency bridge circuit for rectifying its output voltages; a second, normally balanced direct-current bridge circuit connected with its input terminals to said rectifier means, respectively, and comprising at least one variable resistor component; balancing means including amplifier means connected diagonally across said second bridge circuit and servo-motor means operable by the output of said amplifier means for adjusting said variable resistor component, in case the rectified output voltages of said high-frequency circuit applied to said second bridge circuit differ due to unbalance in said high-frequency bridge circuit, for balancing said second bridge circuit; and means for indicating the degree of adjustment of said variable resistor component, said degree of adjustment being a measurement of the moisture content of said layer.

4. A device as claimed in claim 3, including a second variable resistor component in said second bridge circuit, and a second servo-motor means operable by said amplifier means for adjusting said second variable resistor component for balancing said second bridge circuit, and switch means connected between said amplifier means and both said servo-motor means for alternatively connecting the output of said amplifier means with either one of said servo-motor means, so that when said amplifier means is connected to said second servo-motor means and said one of said capacitors is unaffected by said layer, said second bridge circuit is automatically calibrated by adjustment of said second resistor component to balanced condition, while when said amplifier means is then connected to said first mentioned servo-motor means and said one of said capacitor means is placed in said operative position, said second bridge circuit is balanced by adjustment of said first mentioned resistor component.

5. A device as claimed in claim 1, wherein said two capacitor means of normally equal capacitance are constructed as a voltage divider unit comprising a layer of insulating material, a first set of interconnected exposed electrodes and a second set of interconnected exposed electrodes mounted on one side of said layer of insulating material in such a manner that they constitute one of said capacitors, a third set of interconnected exposed electrodes and a fourth set of interconnected exposed electrodes mounted on the other side of said layer of insulating material in such a manner that they constitute the second one of said capacitors, whereby both said capacitors are identically influenced by ambient factors influencing their normal capacitance, and conductor means interconnecting the second and third sets of exposed electrodes.

6. A device as claimed in claim 4, wherein said two capacitor means of normally equal capacitance are constructed as a voltage divider unit comprising a layer of insulating material, a first set of interconnected exposed electrodes and a second set of interconnected exposed electrodes mounted on one side of said layer of insulating material in such a manner that they constitute one of said capacitors, a third set of interconnected exposed electrodes and a fourth set of interconnected exposed electrodes mounted on the other side of said layer of insulating material in such a manner that they constitute the second one of said capacitors, whereby both said capacitors are identically influenced by ambient factors influencing their normal capacitance.

7. A device as claimed in claim 5, wherein said layer of insulating material has a comparatively high thermal conductivity so that equalization of the temperatures of said two capacitors is enhanced.

8. A device as claimed in claim 6, wherein said layer of insulating material has a comparatively high thermal conductivity so that equalization of the temperatures of said two capacitors is enhanced.

9. A humidity sensing element of the capacitive voltage divider type comprising a substantially flat body of insulating material, a pair of electrodes on one surface of the body in capacitive relation to one another and adapted to be exposed to material having varying amounts of moisture therein, whereby to vary the capacitance between said electrodes, a second pair of electrodes on the opposite surface of said body in capacitive relation to each other, and conductor means interconnecting one of said first pair of electrodes with one of said second pair of electrodes.

10. The structure of claim 9, and wherein said body of insulating material has relatively high heat conductivity.

11. A humidity sensing element of the capacitive voltage divider type comprising a substantially flat body of insulating material, a pair of straight, elongated, relatively flat electrodes mounted in side-by-side parallel relation on one surface of the body in capacitive relation to one another and adapted to be exposed to material having varying amounts of moisture therein, whereby to vary the capacitance between said electrodes, a second pair of straight, elongated, relatively flat electrodes mounted in side-by-side parallel relation on the opposite surface of said body in capacitive relation to each other, and conductor means interconnecting one of said first pair of electrodes with one of said second pair of electrodes.

12. A humidity sensing element of the capacitive voltage divider type comprising a substantially flat body of insulating material, a series of spaced electrodes mounted on one surface of the body in capacitive relation to one another and distributed over a substantial area, means interconnecting alternate electrodes, whereby to define a flat distributed capacitor having alternating plates, said electrodes being adapted to be exposed to material having varying amounts of moisture therein, whereby to vary the capacitance of said capacitor, a second series of spaced electrodes mounted on the opposite surface of said body in capacitive relation to one another and distributed in substantially the same manner as the first-named series of electrodes, means interconnecting alternate electrodes of said second series of electrodes, whereby to define a second flat distributed capacitor having alternating plates, and conductor means interconnecting one set of the interconnected electrodes of the first series of electrodes with one set of the interconnected electrodes of the second series of electrodes.

13. The structure of claim 12, and wherein said series of electrodes each comprises straight, elongated, relatively flat conductors disposed in side-by-side parallel relation.

14. The structure of claim 12, and wherein said body of insulating material has relatively high heat conductivity.

15. The structure of claim 12, and wherein said conductor means is contained within said body of insulating material.

References Cited in the file of this patent

UNITED STATES PATENTS

| | | |
|---|---|---|
| 1,984,166 | Walter | Dec. 11, 1934 |
| 2,219,497 | Stevens et al. | Oct. 29, 1940 |
| 2,300,742 | Harrison et al. | Nov. 3, 1942 |
| 2,428,700 | Eilenberger | Oct. 7, 1947 |
| 2,558,945 | Fritzinger | July 3, 1951 |
| 2,718,620 | Howe | Sept. 20, 1955 |
| 2,783,420 | Thompson et al. | Feb. 26, 1957 |